United States Patent [19]
Miyauchi et al.

[11] Patent Number: 5,274,521
[45] Date of Patent: Dec. 28, 1993

[54] PLANAR THIN FILM MAGNETIC HEAD

[75] Inventors: Teiichi Miyauchi; Kiyoshi Yamakawa; Atsushi Matsuzono, all of Kanagawa, Japan

[73] Assignee: Sony Corporation, Tokyo, Japan

[21] Appl. No.: 747,868

[22] Filed: Aug. 20, 1991

[30] Foreign Application Priority Data

Aug. 23, 1990 [JP] Japan .................. 2-221960
Aug. 31, 1990 [JP] Japan .................. 2-231873

[51] Int. Cl.$^5$ ............................... G11B 5/23
[52] U.S. Cl. ........................ 360/119; 360/113; 360/125; 360/126
[58] Field of Search ........... 360/110, 113, 119, 122, 360/125, 126

[56] References Cited

U.S. PATENT DOCUMENTS

| | | |
|---|---|---|
| 4,322,763 | 3/1982 | Lemke .................. 360/115 |
| 4,789,910 | 12/1988 | Otsuka et al. ........... 360/113 |

FOREIGN PATENT DOCUMENTS

| | | |
|---|---|---|
| 0265798 | 5/1988 | European Pat. Off. |
| 0298417 | 1/1989 | European Pat. Off. |
| 8908015 | 12/1990 | France |

Primary Examiner—Paul M. Dzierzynski
Assistant Examiner—Don Wong
Attorney, Agent, or Firm—Hill, Steadman & Simpson

[57] ABSTRACT

A planar thin film magnetic head is disclosed wherein an axis of easy magnetization in the vicinity of a magnetic gap of a magnetic yoke is forcibly made coincident with the direction of a track width by a magnetic field due to current flowing in a conductor layer. Accordingly, even though the track width is small, a high magnetic permeability, low Barkhausen noise and linear responsiveness can be realized to thereby improve the sensitivity, output and linearity. In another aspect of the invention, a throat portion is eliminated from a thin film magnetic core forming a magnetic gap. The thin film magnetic core is configured such that a pair of magnetic members constituting the magnetic core are diverged from the magnetic gap so that a divergent angle $\theta$, of first opposite side edges of the magnetic members, from a direction of the gap length of the magnetic gap, is set to the range of $30° \leq \theta \leq 80°$, and the magnetic members have second opposite side edges extending in substantially parallel to the direction of the gap length of the magnetic gap. Accordingly, even though a track width is reduced less than 10 $\mu$m, adjoining crosstalk or off track crosstalk can be avoided to thereby realize low-noise and high quality reproduction and improve the operating characteristics.

11 Claims, 15 Drawing Sheets

PLANAR THIN FILM MAGNETIC HEAD

BACKGROUND OF THE INVENTION

1. Field of the Invention

The present invention relates to a planar thin film magnetic head, and more particularly to a magnetic head of a magneto-resistance effect type suitable for a small track width.

There is shown in FIGS. 12 to 14 a conventional thin film magnetic head of a horizontal type or a so-called planar type. FIG. 12 is a perspective view of a magnetic head slider; FIG. 13 is a schematic enlarged sectional view of the thin film magnetic head taken along a direction of a track width; and FIG. 14 is a schematic enlarged perspective view of a magnetic gap of the thin film magnetic head.

Referring to FIG. 12, reference numeral 100 generally designates a magnetic head slider having a base 101. The base 101 is formed with a groove 102 extending in a travelling direction on a surface opposed to a magnetic recording medium (not shown), so that a rail-like ABS (Air Bearing Surface) 81 is formed on the opposite sides of the groove 102. The ABS 81 is formed with a slant surface 104 at a rear end with respect to the travelling direction, so as to effect smooth flying over the magnetic recording medium. Furthermore, a planar thin film magnetic head 90 is formed on the ABS 81 at a front end thereof with respect to the travelling direction.

Referring to FIG. 13, the thin film magnetic head 90 is formed in a recess 101a of the base 101 formed of an insulating material such as silicon. The thin film magnetic head 90 includes a thin film magnetic core 113 formed of a magnetic material such as permalloy, a magnetic gap 118 formed in the thin film magnetic core 113, a conductor layer 114, insulator layers 115 and 75, a coil 116, and a protector layer 117 forming a part of the ABS 81. A through hole 112 is formed through the base 101, so as to form the conductor layer 114 and the insulator layer 115 therein.

As apparent from FIG. 14 showing a gap forming portion of the thin film magnetic core 113 forming the magnetic gap 118, the thin film magnetic core 113 is generally configured such that it is gradually widened in a direction of a track width Tw as it comes away from the magnetic gap 118. Furthermore, the gap forming portion of the thin film magnetic core 113 is formed as a throat portion 119 having a constant width defining the track width Tw. The coil 116 is a thin film coil wound in a plane below the thin film magnetic core 113.

FIG. 17 is a vertical sectional view of a thin film magnetic head of a magneto-resistance effect type (which will be hereinafter referred to as an MR type) as an example of the planar thin film magnetic head 90. Referring to FIG. 17, an MR device 126 as an MR thin film is formed on the base 101, and a thin film magnetic yoke 127 is formed to be connected to opposite ends of the MR device 126. The thin film magnetic yoke 127 is formed at its central portion with a magnetic gap g flush with an ABS 122. A bias conductor 128 for applying a required bias magnetic field to the MR device 126 is formed between the MR device 126 and the thin film magnetic yoke 127 under the magnetic gap g, so that the MR device 126 is operated in a magneto-resistance characteristic area with good linearity and high sensitivity. A non-magnetic protection film 129 is formed on the thin film magnetic yoke 127 except the gap forming portion to constitute a part of the ABS 122.

As shown in FIG. 15, a throat portion 129 of the thin film magnetic yoke 127 forming the magnetic gap g has a width defining the track width Tw. In the case that the track width Tw is relatively large such as about 10 $\mu$m or more, a principal magnetic domain 130 becomes a closed magnetic domain structure along a direction of the track width Tw, that is, an axis of easy magnetization can be formed in the direction of the track width Tw. Accordingly, the magnetic head can be operated by rotation of magnetization for a magnetic flux of a signal introduced from the magnetic gap g. As a result, a Barkhausen noise is reduced to provide a linear responsiveness.

However, it has been recently demanded to further increase a recording density, causing the track width Tw to be more reduced. When the track width Tw becomes less than 10 $\mu$m, e.g., about 5 $\mu$m, the width of the throat portion 129 forming the magnetic gap g becomes small and causes a large influence of shape anisotropy, resulting in a difficulty of orientation of magnetization in the direction of the track width Tw because of an increased static magnetic energy. That is, the axis of easy magnetization is oriented in the direction of the gap length perpendicular to the track width Tw. As a result, a magnetic domain wall in the vicinity of the magnetic gap g in the magnetic yoke 127 irreversibly functions for magnetic flux of a signal introduced from the magnetic gap g upon reproduction, thus exhibiting a non-linear responsiveness. That is, a Barkhausen noise due to movement of the magnetic domain wall is induced in a reproductive waveform, or the magnetic permeability in the vicinity of the magnetic gap g is reduced so that a sufficient reproductive output cannot be obtained.

The above problem occurs not only in the MR type thin film reproducing magnetic head as mentioned above, but also in an electromagnetic induction type planar recording (reproducing) thin film magnetic head having a structure such that a thin-film coil or the like is substantially wound around a magnetic yoke.

SUMMARY OF THE INVENTION

There is shown an essential part of the planar thin film magnetic head according to a first aspect of the present invention in FIGS. 1 to 4, wherein FIG. 1 is a plan view of the essential part; FIG. 2 is a perspective view of FIG. 1; FIG. 3 is a cross section taken along the line III—III in FIG. 1; and FIG. 4 is a cross section taken along the line A—A in FIG. 3.

As shown in FIGS. 1 to 4, there is provided a planar thin film magnetic head having a thin film magnetic yoke 37 formed with a magnetic gap g, said thin film magnetic yoke 37 extending substantially along a recording surface of a magnetic recording medium (not shown); said planar thin film magnetic head comprising a non-magnetic conductor layer 1 located at an intermediate position of at least a gap forming portion of the thin film magnetic yoke 37 forming the magnetic gap g (i.e., at an intermediate position between opposite end portions 37AE and 37BE of a pair of yoke halves 37A and 37B opposed to each other, with the magnetic gap g defined therebetween, which opposite end portions 37AE and 37BE define a track width Tw of the magnetic gap g) with respect to a direction of a gap depth of the magnetic gap g, said conductor layer 1 extending in a direction of a gap length (i.e., a direction perpendicular to the direction of the track width Tw) of the magnetic gap g so as to cross the magnetic gap g, said conductor layer being supplied with current in the direction of the gap length of the magnetic gap g.

As shown in FIGS. 3 and 4, the conductor layer 1 is adapted to be supplied with current in the direction of the gap length of the magnetic gap g and is embedded in the thin film magnetic yoke 37. By supplying current to the conductor layer 1, a magnetic field is generated at the gap forming portion of the thin film magnetic yoke 37 forming the magnetic gap g, that is, at the opposite end portions 37AE and 37BE. As shown in FIG. 4, when the direction of the current to be supplied to the conductor layer 1 is oriented from the upper side of the plane of the drawing to the lower side thereof, the magnetic field having a direction of arrows P is generated around the conductor layer 1 in the thin film magnetic yoke 37. That is, the magnetic field is applied in the direction of the track width Tw. Accordingly, even though the track width Tw is set to be less than 10 μm, e.g., about 5 μm, the magnetic domain structure as shown in FIG. 16 is approximated to the magnetic domain structure as shown in FIG. 15. As a result, the axis of easy magnetization is made substantially coincident with the direction of the track width Tw, thereby improving the magnetic permeability in the vicinity of the magnetic gap g and, improving the reproductive output and realizing a low Barkhausen noise and linear responsiveness.

There is shown an essential part of the thin film magnetic head according to a second aspect of the present invention in FIG. 7. As shown in FIG. 7, there is provided a thin film magnetic head comprising a thin film magnetic core 72 having a magnetic gap 71 substantially parallel to a magnetic recording medium (not shown); said thin film magnetic core 72 comprising a pair of magnetic members 72A having opposed end surfaces 73 between which the magnetic gap 71 is defined, said opposed end surfaces 73 having a width defining a track width Tw; said magnetic members 72A being gradually widened as they come away from the magnetic gap 71 so that a divergent angle $\theta$ of first opposite side edges 74A and 75A of the magnetic members 72A, from the direction of the gap length of the magnetic gap 71, is set to the range of $30° \leq \theta \leq 80°$. The magnetic members 72A have second opposite side edges 74B and 75B extending substantially parallel to the direction of the gap length of the magnetic gap 71.

As mentioned above, no throat portion is formed in the thin film magnetic core 72, and the thin film magnetic core 72 is configured such that the width of the opposed end surfaces 73, with the magnetic gap 71 therebetween, defines the track width Tw, and the magnetic members 72A are gradually widened as they come away from the magnetic gap 71. Accordingly, even though the width of the opposed end surfaces 73 is set to be less than 10 μm, a magnetic domain structure can be made into the structure as shown in FIG. 8. That is, assuming that the direction of the gap length of the magnetic gap 71 is the X direction, and that the direction of the track width Tw perpendicular to the gap length is the Y direction, the axis of easy magnetization is made coincident with the Y direction.

Accordingly, even though the track width Tw is small, magnetization of the thin film magnetic core 72 in the vicinity of the magnetic gap 71 linearly responds to a magnetic flux introduced from the magnetic gap 71 upon reproduction, thereby suppressing the generation of Barkhausen noise due to movement of a magnetic domain wall in a reproductive waveform, and also suppressing a reduction in magnetic permeability in the vicinity of the magnetic gap 71, that is, at the opposed end portions of the magnetic members 72A of the thin film magnetic core 72, with the result that a sufficient reproductive output can be obtained.

Furthermore, a throat portion is eliminated from the thin-film magnetic core 72 forming the magnetic gap 71, and the thin film magnetic core 72 is configured such that the magnetic members 72A are diverged from the magnetic gap 71 so that the divergent angle $\theta$ of the first opposite side edges 74A and 75A of the magnetic members 72A, from the direction of the gap length (i.e., X direction) of the magnetic gap 71, is set to the range of $30° \leq \theta \leq 80°$, and that the magnetic members 72A have the second opposite side edges 74B and 75B extending in substantially parallel to the X direction. Accordingly, even though the track width Tw is reduced less than 10 μm, no magnetic gap is formed by the magnetic members 72A in an area remote from the gap forming portion as shown by the line A—A in FIG. 7, and accordingly adjoining crosstalk or off track crosstalk can be avoided to thereby realize low-noise and high-quality reproduction and improve the operating characteristics.

DETAILED DESCRIPTION OF THE PREFERRED EMBODIMENTS

Figure 1:
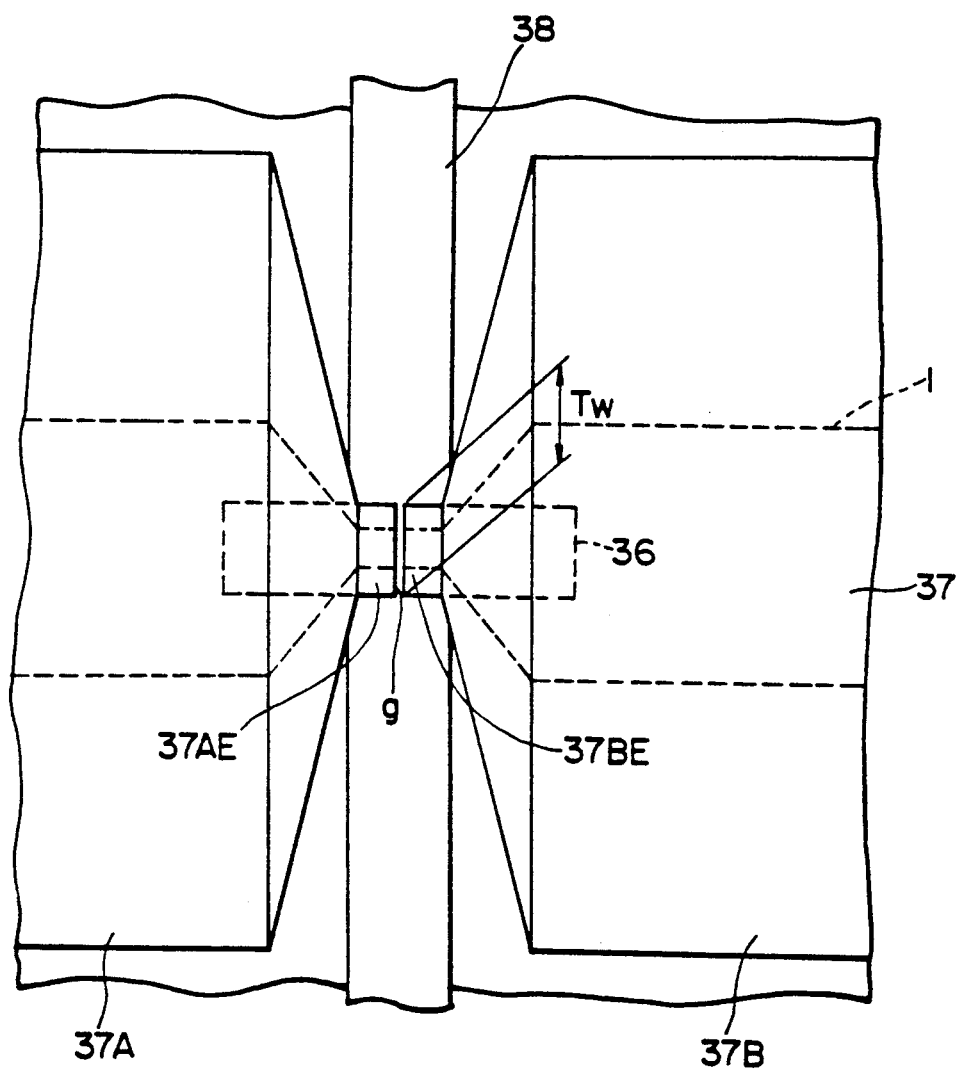
FIG. 1 is a plan view of an essential part of a preferred embodiment of the planar thin film magnetic head according to a first aspect of the present invention.
Figure 2:
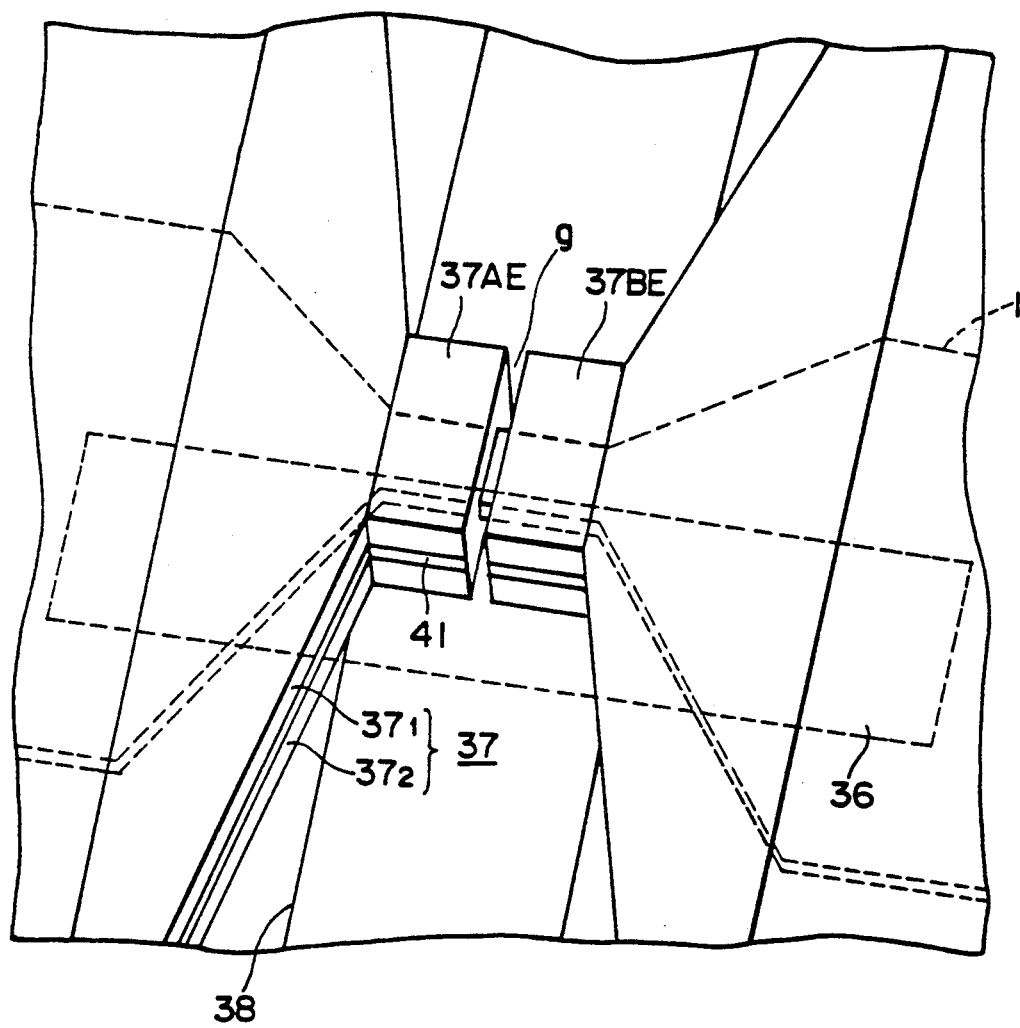
FIG. 2 is a perspective view of FIG. 1.
Figure 3:
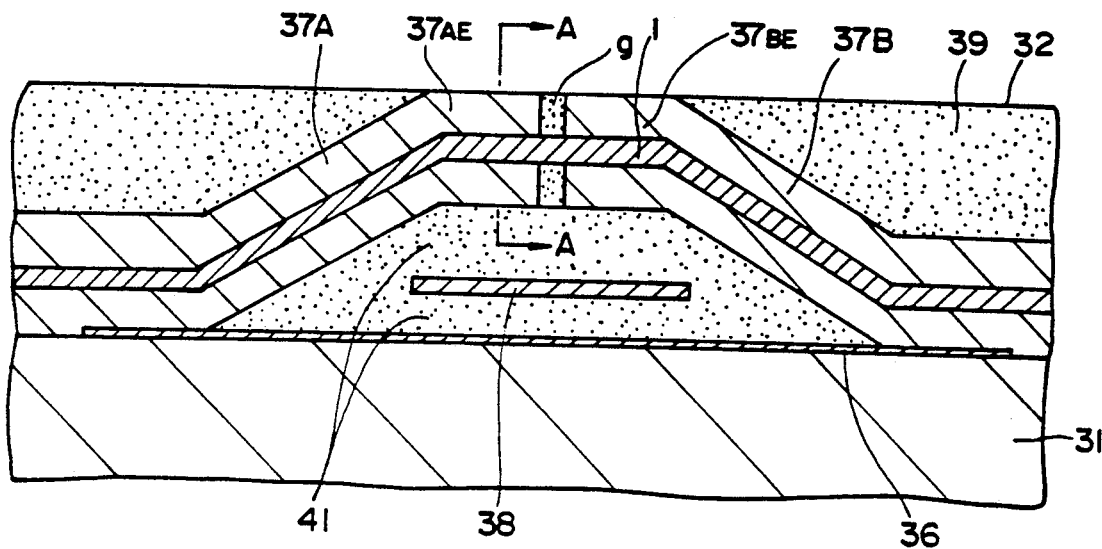
FIG. 3 is a cross section taken along the line 111—111 in FIG. 1.
Figure 4:
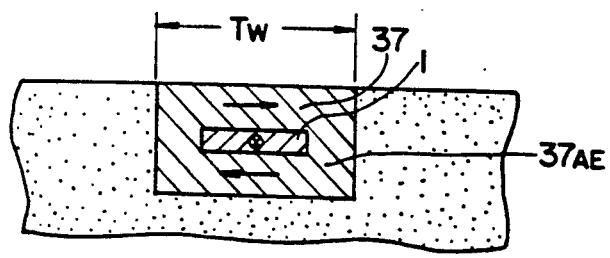
FIG. 4 is a cross section taken along the line A—A in FIG. 3.

FIGS. 1 to 4 show a preferred embodiment wherein the present invention is applied to an MR type planar thin film reproducing magnetic head. Referring to FIGS. 1 to 4, reference numeral 31 designates a base of a magnetic head slider, for example. An MR device 36 is formed on the base 31. A non-magnetic insulator layer 41 such as $SiO_2$ layer is formed on the MR device 36. A bias conductor 38 for applying a bias magnetic field to the MR device 36 is formed on the non-magnetic insulator layer 41 so as to extend in a direction crossing the longitudinal direction of the MR device 36. A second non-magnetic insulator layer 41 such as $SiO_2$ layer is formed on the bias conductor 38. A thin film magnetic yoke 37 is so formed as to cover the second non-magnetic insulator layer 41 and be magnetically connected to opposite ends of the MR device 36. The thin film magnetic yoke 37 is comprised of a pair of magnetic yoke halves 37A and 37B. At a central portion of the thin film magnetic yoke 37, there is defined a magnetic gap g between the two magnetic yoke halves 37A and 37B. The thin film magnetic yoke 37 has a double-layer structure consisting of an upper layer $37_1$ and a lower layer $37_2$. Between the upper layer $37_1$ and the lower layer $37_2$, there is interposed a conductor, layer 1 so as to cross the magnetic gap g. As shown in FIG. 4 which is a cross section taken along the line A—A in FIG. 3, the conductor layer 1 is fully surrounded by the thin film magnetic yoke 37 except a portion crossing the magnetic gap g. Accordingly, a closed magnetic path is formed in the cross section of the thin film magnetic yoke 37.

As apparent from FIG. 3, upper surfaces of gap forming portions 37AE and 37BE of the magnetic yoke halves 37A and 37B constituting the thin film magnetic yoke 37 are flush with an ABS 32 of the slider. On the thin film magnetic yoke 37 except the upper surfaces of the gap forming portions 37AE and 37BE, a protection film 39 is formed so that an upper exposed surface thereof forms a part of the ABS 32.

Although the present invention is applied to an MR type thin film reproducing magnetic head in the above preferred embodiment, the present invention is not limited to this type, but it may be applied to an induction type magnetic head having a thin film magnetic yoke.

Figure 5A:
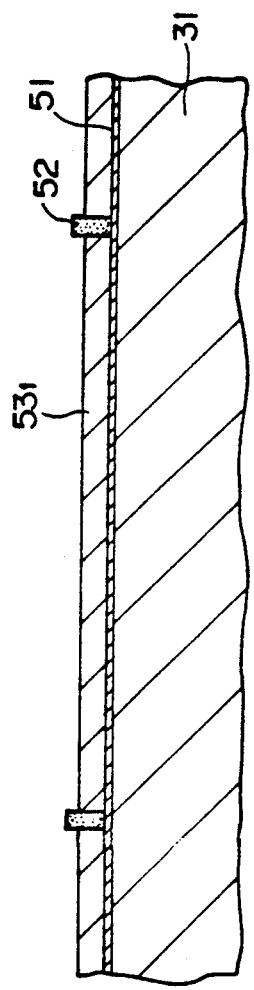
FIGS. 5A to 5Q are sectional views illustrating a process for manufacturing a composite type planar thin film magnetic head according to the first aspect of the present invention.
Figure 5Q:
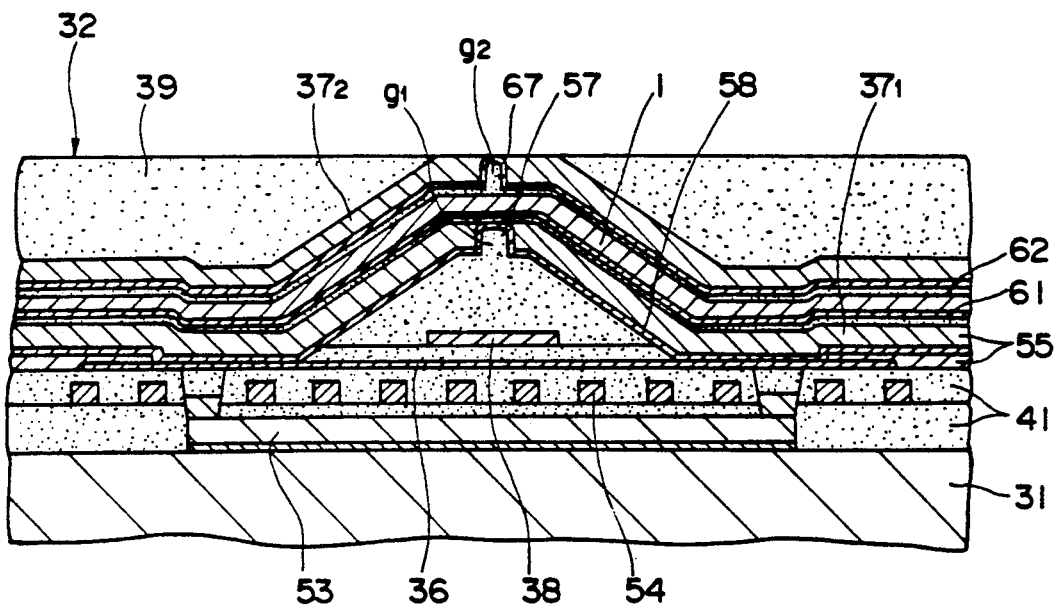
Figure 6:
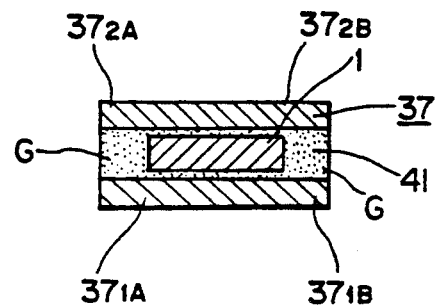
FIG. 6 is a sectional view similar to FIG. 4, showing another preferred embodiment.

Now, there will be described with reference to FIGS. 5A to 5Q and FIG. 6 a second preferred embodiment wherein the present invention is applied to a composite type planar thin film magnetic head constructed by combining the MR type thin film reproducing magnetic head as mentioned above and an induction type recording magnetic head. FIGS. 5A to 5Q show an example of a manufacturing method for such a composite type planar thin film magnetic head.

Referring first to FIG. 5A, a base 31 formed of an insulating material such as $Al_2O_3 \cdot TiC$, $CaTiO_3$, ferrite ceramic, or crystallized glass is prepared. Although not shown, a recess is formed at a thin film magnetic head forming portion of the base 31. Then, a conductor layer 51 such as NiFe layer is formed by sputtering or the like on an upper surface of the base 31 including the thin film magnetic head forming portion. Then, a plating resist 52 such as photoresist is formed on the conductor layer 51 by coating, pattern exposure and developing, so as to form an outer peripheral wall along a contour pattern of a back thin film magnetic yoke 53 to be formed in the next step shown in FIG. 5B. Then, a magnetic layer $53_1$, such as NiFe layer is electroplated on the conductor layer 51 at a portion except the plating resist 52.

Figure 5B:
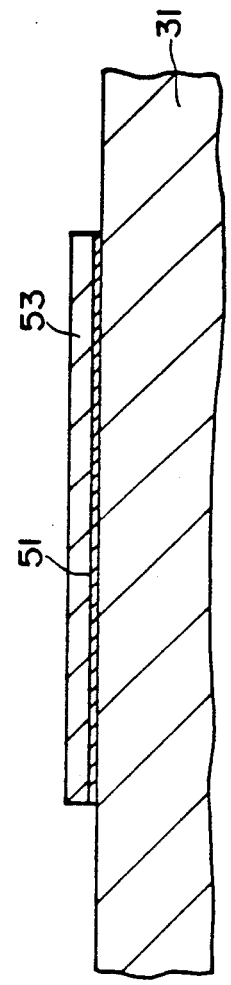

Referring to FIG. 5B, the magnetic layer $53_1$ and the conductor layer 51 outside the plating resist 52 are etched off by ion milling or the like to thereby form the back thin film magnetic yoke 53 and then remove the plating resist 52.

Figure 5C:
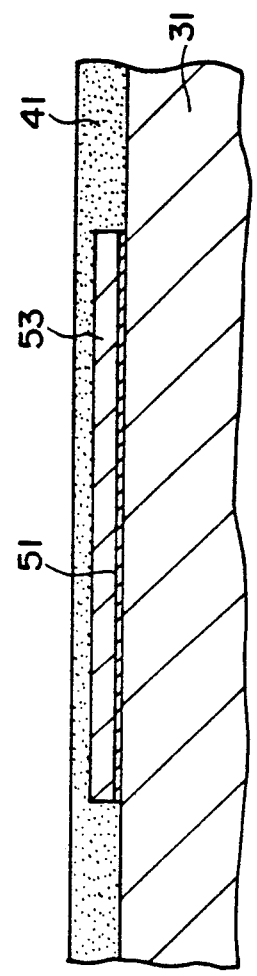

Referring to FIG. 5C, a non-magnetic insulator layer 41 such as $SiO_2$ layer is so formed as to entirely cover the back thin film magnetic yoke 53 by sputtering or the like. Then, an upper surface of the non-magnetic insulator layer 41 is polished to provide a flat surface.

Figure 5D:
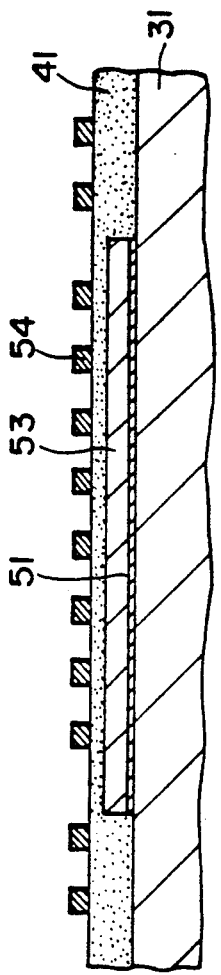

Referring to FIG. 5D, a thin film coil 54 as a head winding is formed on the flat surface of the insulator layer 41. The thin film coil 54 is formed by first forming a good conductive metal thin film such as Cu thin film on the entire flat surface of the insulator layer 41 by sputtering or vapor deposition, and then patterning the metal thin film by IBE (ion beam etching) using photolithography to obtain a desired pattern.

Figure 5E:
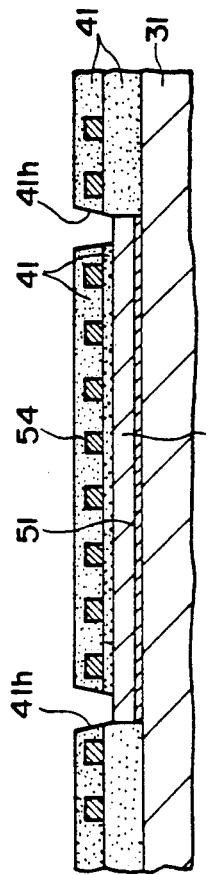

Referring to FIG. 5E, a second insulator layer 41 such as $SiO_2$ layer is further formed so as to entirely cover the thin film coil 54, and openings 41h are formed through the second insulator layer 41 so as to expose the opposite ends of the back thin film magnetic yoke 53 to the outside. The formation of the openings 41h can be effected by patterning using photolithography.

Figure 5F:
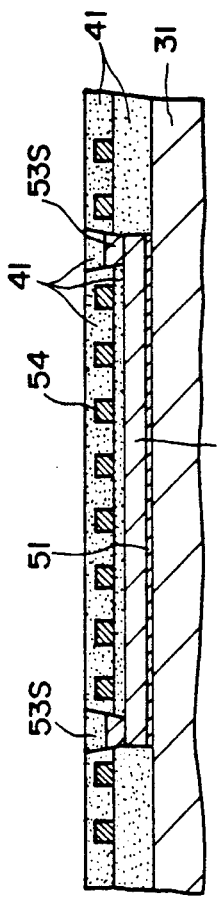

Referring to FIG. 5F, a magnetic material such as NiFe is electroplated to a desired thickness in the openings 41h by utilizing the first and second insulating layers 41 as a plating resist to thereby form rising portions 53S of the back thin film magnetic yoke 53 in the openings 41h. Then, a third insulator layer 41 such as $SiO_2$ layer is formed on the rising portions 53S so as to cover the same in such a manner that an upper surface of the third insulator layer 41 becomes flush with an upper surface of the second insulator layer 41. Then, the upper surfaces of the second and third insulator layers 41 are flattened.

Figure 5G:
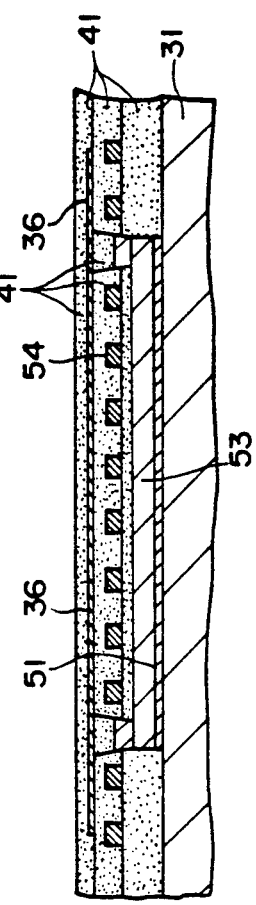

Referring to FIG. 5G, an MR device 36 is formed on the flat upper surfaces of the second and third insulator layers 41. The MR device 36 is a thin film formed of permalloy, NiFe, NiCo, NiFeCo, etc. having a thickness of about 300–500 angstroms. The formation of this MR film constituting the MR device 36 can be effected by first forming the thin film on the entire upper surfaces of the second and third insulator layers 41 by sputtering or the like and then etching the thin film to a desired pattern by ion milling. The MR film may be formed as a single layer. Alternatively, it may be formed as two layers with a non-magnetic layer interposed therebetween, so as to avoid the generation of a magnetic domain wall. Thereafter, a fourth insulator layer 41 such as $SiO_2$ layer is so formed as to entirely cover the MR device 36. A thickness of the fourth insulator layer 41 is set to 0.5–1 µm, for example.

Figure 5H:
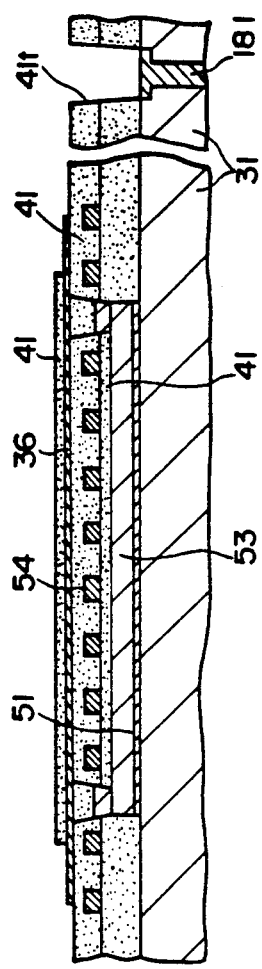
Figure 5:
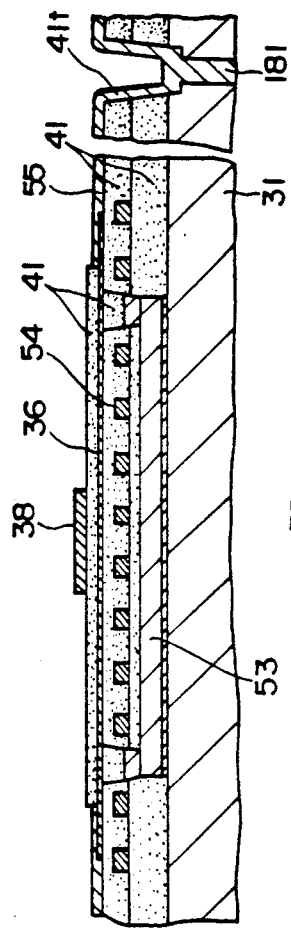

Referring to FIG. 5H, a portion of the fourth insulator layer 41 formed on the opposite ends of the MR device 36 is selectively etched off to expose the opposite ends of the MR device 36 to the outside. Then, an opening 41t is formed through the first and second insulator layers 41 so as to expose an end of a terminal leading conductor layer 181 embedded in a through hole preliminarily formed through the base 31.

Referring to FIG. 5I, a bias conductor 38 is formed on the fourth insulator layer 41 so as to cross the MR device 36. Further, an MR electrode 55 is so formed as to connect the opposite ends of the MR device 36 to the terminal leading conductor layer 18₁ embedded in the base 31. The formation of the bias conductor 38 and the formation of the MR electrode 55 can be simultaneously effected by first sputtering a good conductive metal film such as Cu film to a thickness of 2000-3000 angstroms and then etching the metal film to a desired pattern.

Figure 5J:
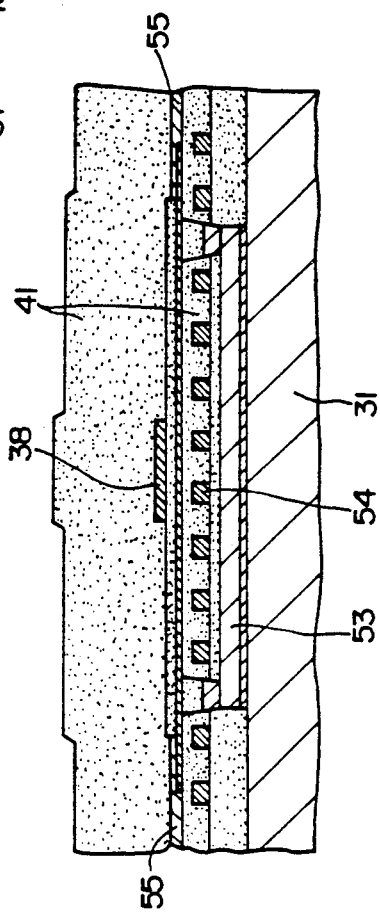

Referring to FIG. 5J, a fifth insulator layer 41 such as $SiO_2$ layer is so formed as to entirely cover the bias conductor 38, the MR electrode 55 and the fourth insulator layer 41 by sputtering or the like. A thickness of the fifth insulator, layer 41 is set to 2-3 μm.

Figure 5K:
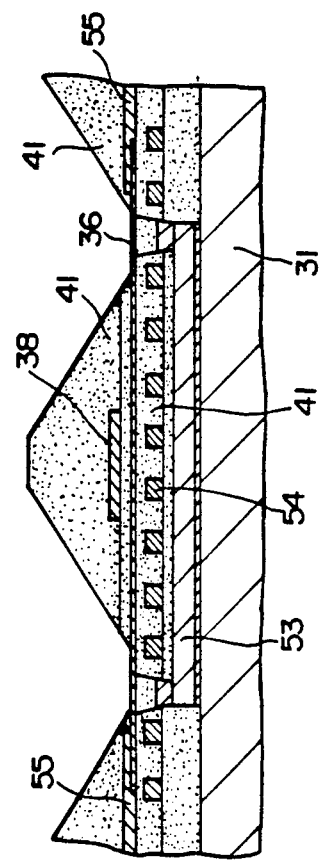

Referring to FIG. 5K, the fourth and fifth insulator layers 41 formed on the MR device 36 and the bias conductor 38 are taperingly etched off by RIE (reactive ion etching) or the like, so as to expose opposite end portions of the MR device 36 to the outside.

Figure 5L:
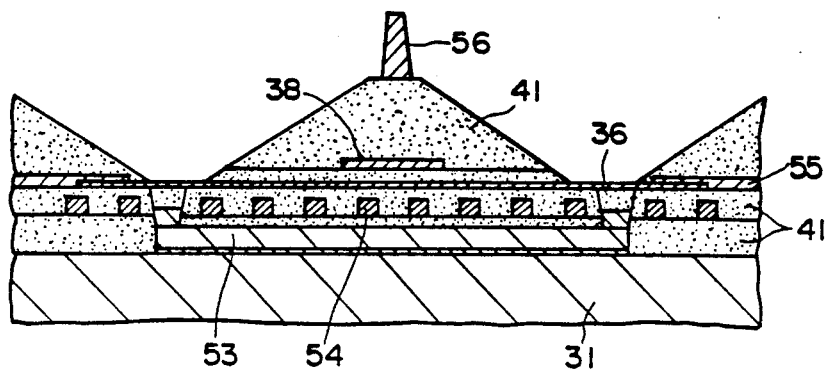

Referring to FIG. 5L, a resist 56 is formed on the fifth insulator layer 41 at a position just over the bias conductor 38 by a known technique. A width of the resist 56 is set to 1-5 μm.

Figure 5M:
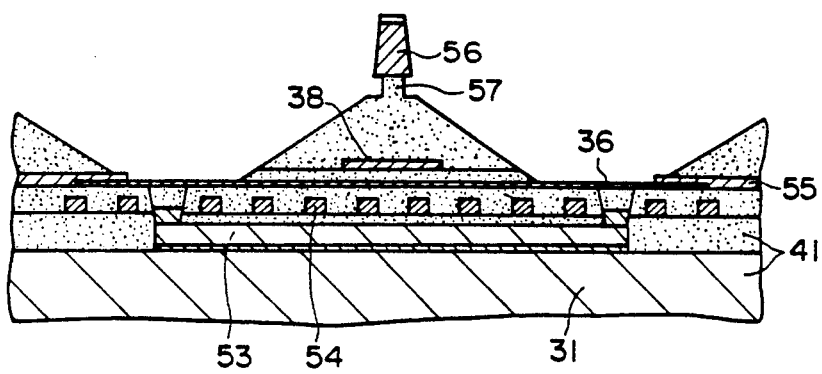

Referring to FIG. 5M, the fifth insulator layer 41 is etched to a desired thickness by utilizing the resist 56 as an etching mask, so as to form a projection 57 of the fifth insulator layer 41 under the resist 56. Then, the resist 56 is removed to form the projection 57 having a width smaller than the width of the resist 56. A height of the projection 57 is set in correspondence to a thickness of a first thin film magnetic yoke to be formed later.

Figure 5N:
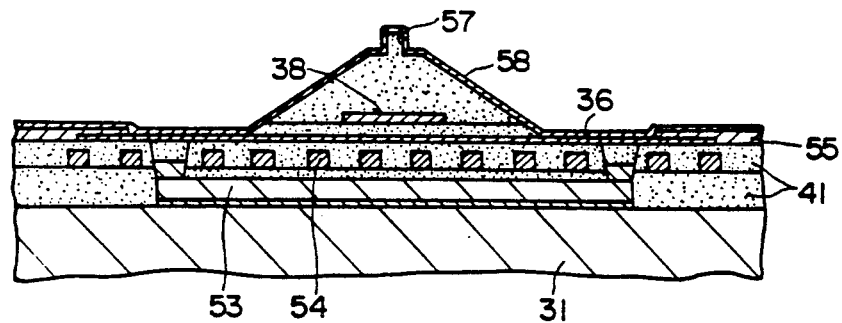

Referring to FIG. 5N, the fifth insulator layer 41 is selectively etched off in such a manner that a portion of the fifth insulator layer 41 embedding the bias conductor 38 therein is left, and the other portion is removed. Then, a first backing magnetic conductor layer 58 such as NiFe layer is formed by electroplating or sputtering on the entire upper surface of the fifth insulator layer 41 left above and the other area.

Figure 5O:
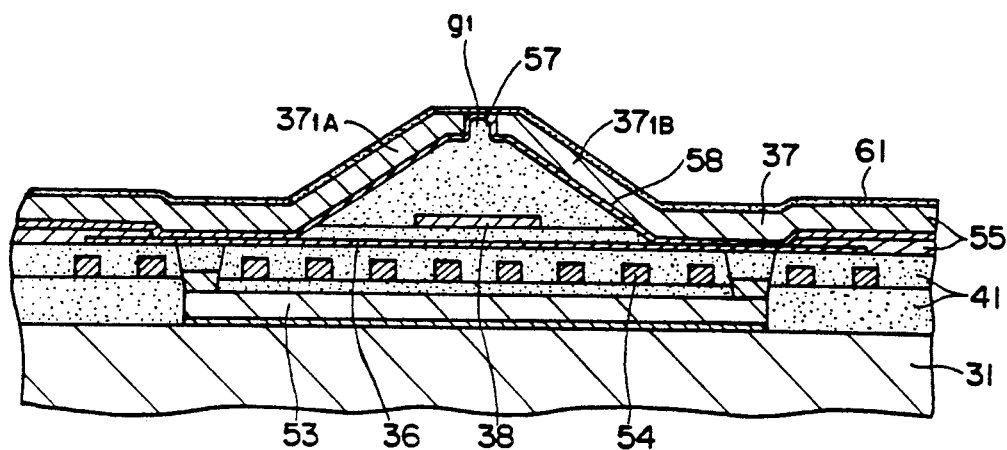

Referring to FIG. 5O, a first thin film magnetic yoke 37₁ is formed on the first backing magnetic conductor layer 58 by electroplating NiFe to a thickness of 1-3 μm and patterning the NiFe layer by etching such as IBE (ion beam etching), so that a pair of magnetic yoke halves 37₁A and 37₁B constituting the first thin film magnetic yoke 37₁ are formed on opposite sides of a first magnetic gap g₁, formed by the non-magnetic projection 57. Accordingly, the magnetic yoke halves 37₁A and 37₁B are magnetically connected to the MR device 36 and the rising portions 53S of the back thin film magnetic yoke 5 through the third insulator layers 41 interposed therebetween. Then, a first interlayer insulator layer 61 such as $SiO_2$ layer is formed on the first thin film magnetic yoke 37₁ by sputtering or the like to a thickness of about 0.2-0.3 μm.

Figure 5P:
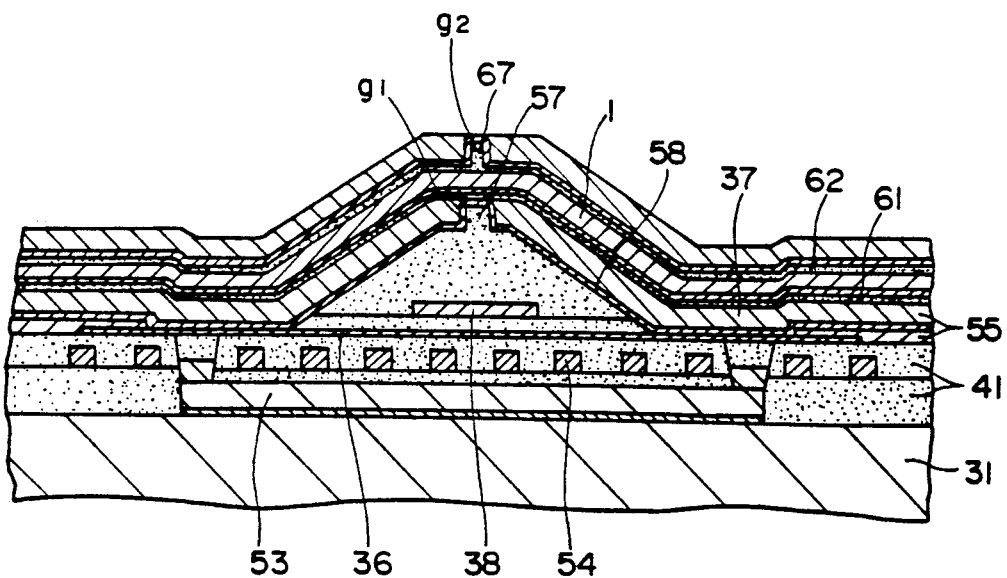

Referring to FIG. 5P, a second backing magnetic conductor layer 66 such as NiFe layer is formed on the first interlayer, insulator layer 61 by sputtering or the like. Then, a nonmagnetic conductor layer 1 is formed on the second backing magnetic conductor layer 66 so as to ride over the first magnetic gap g₁ by sputtering a non-magnetic good-conductor layer such as Cu layer to a thickness of about 0.2-0.3 μm and then patterning the non-magnetic good conductor layer. Then, a second interlayer, insulator layer 62 such as $SiO_2$ layer is formed on the entire upper surface of the non-magnetic conductor layer 1 by sputtering or the like to a thickness of 0.2-0.3 μm. At this time, a projection 67 for defining a second magnetic gap g₂ is integrally formed with the second interlayer insulator layer 62 at a position just over the first magnetic gap g₁ in the same way as previously mentioned with reference to FIGS. 5L to 5O. Then, a third backing magnetic conductor layer 68 such as NiFe layer is formed on the second interlayer insulator layer 62 by electroplating. Then, a second thin film magnetic yoke 37₂ is formed on the third backing magnetic layer 68 in such a manner that a pair of magnetic yoke halves 37₂A and 37₂B, constituting the second thin film magnetic yoke 37₂, are formed on opposite sides of the second magnetic gap g₂.

A gap length $L_{g1}$ of the first magnetic gap g₁ may be set to 1 μm, and a gap length $L_{g2}$ of the second magnetic gap g₂ may be set to 0.5 μm.

Referring to FIG. 5Q, a protection film 39 such as $SiO_2$ film is formed on the second thin film magnetic yoke 37₂ except a forming portion of the second magnetic gap g₂. A top surface of the protection film 39 is flattened to form an ABS 32, so that the gap forming portion is flush with the ABS 32.

In the magnetic head as described above, a magnetic yoke 37 is formed substantially along the ABS 32 by the first and second thin film magnetic yokes 37₁ and 37₂. Furthermore, a magnetic gap g is formed by the first and second magnetic gaps g₁ and g₂, and the non-magnetic conductor layer 1 is embedded in the thin film magnetic yoke 37. Thus, the magnetic head constitutes a composite magnetic head composed of an MR type reproducing magnetic head forming a closed magnetic path including the magnetic gap g by the thin film magnetic yoke 37 and the MR device 36 and of an induction type recording magnetic head forming a closed magnetic path including the magnetic gap g by the thin film magnetic yoke 37 and the back thin film magnetic yoke 53 and including the thin film coil 5 winding this closed magnetic path in a plane.

As mentioned above, the terminal leading conductor layer 18₁ is preliminarily formed in the base 31 of the magnetic head slider. The formation of this terminal leading conductor layer 18₁ can be effected by first forming a through hole at a predetermined portion of the base 31 formed of an insulating material, then forming a backing conductor layer on the entire outer surface of the base 31 including a wall surface of the through hole by sputtering Cu, for example, then filling the through hole with Ni, for example, by electroplating, and finally polishing off the backing conductor layer formed on the outer surface of the base 31.

In the above preferred embodiment, the non-magnetic conductor layer 1 is embedded in the thin film magnetic yoke 37. In other words, the thin film magnetic yoke 37 is so formed as to entirely surround the non-magnetic conductor layer 1 as shown in FIG. 4. In a modification, a sandwich structure as shown in FIG. 6 may be adopted. That is, referring to FIG. 6, the non-magnetic conductor layer 1 is interposed between the first and second thin film magnetic yokes 37₁ and 37₂ through the interlayer insulator layers 61 and 62. Furthermore, magnetic gaps G are present in opposite side areas of the nonmagnetic conductor layer 1.

In any case, the non-magnetic conductor layer 1 is present at the forming portion of the magnetic gap g. Therefore, when current is supplied in a direction of the gap length of the magnetic gap g, a magnetic field generated by this current operates to orient an axis of easy magnetization of the thin film magnetic yoke 37 in the vicinity of the magnetic gap g nearly in a direction of a track width.

It is to be appreciated that the present invention is not limited to the above preferred embodiment, but may be applied to any type magnetic heads other than the slider type head, and that various changes and modifications may be made within the scope of the invention.

There will now be described a preferred embodiment of the thin film magnetic head according to the second aspect of the present invention with reference to FIGS. 7 to 11.

Figure 7:
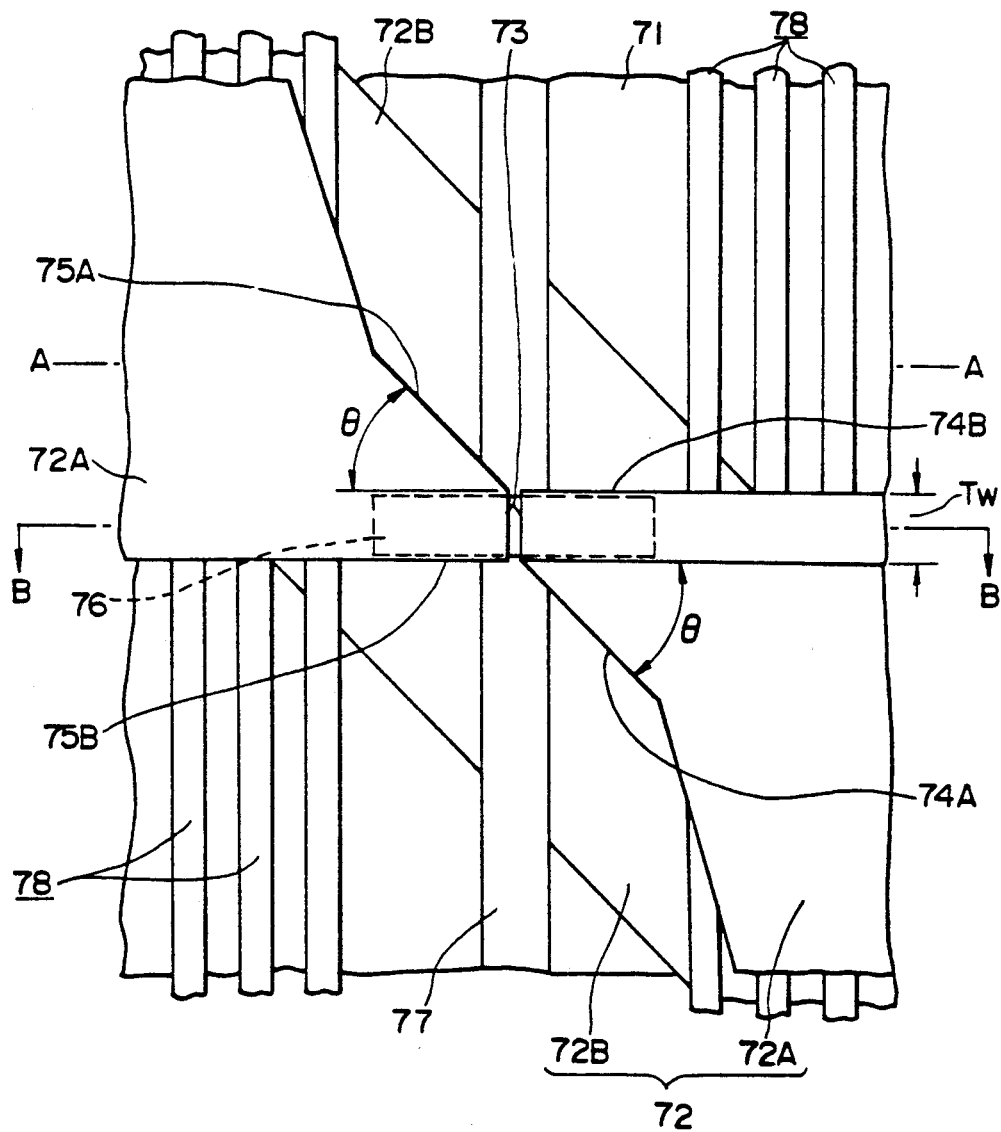
FIG. 7 is a plan view of an essential part of a preferred embodiment of the thin film magnetic head according to a second aspect of the present invention.
Figure 8:
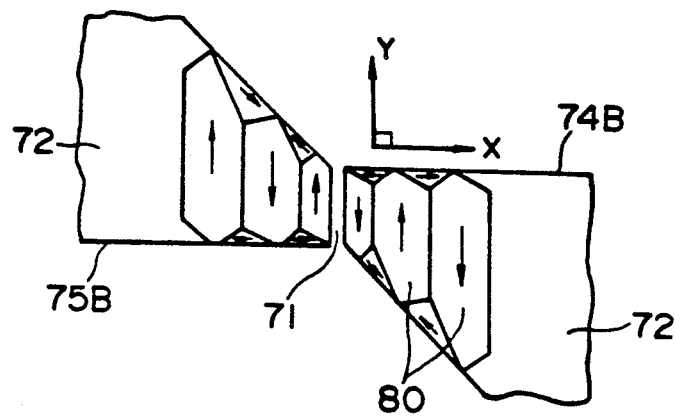
FIG. 8 is a schematic plan view showing a magnetic domain structure at a magnetic gap forming portion of the thin film magnetic head shown in FIG. 7.
Figure 9:
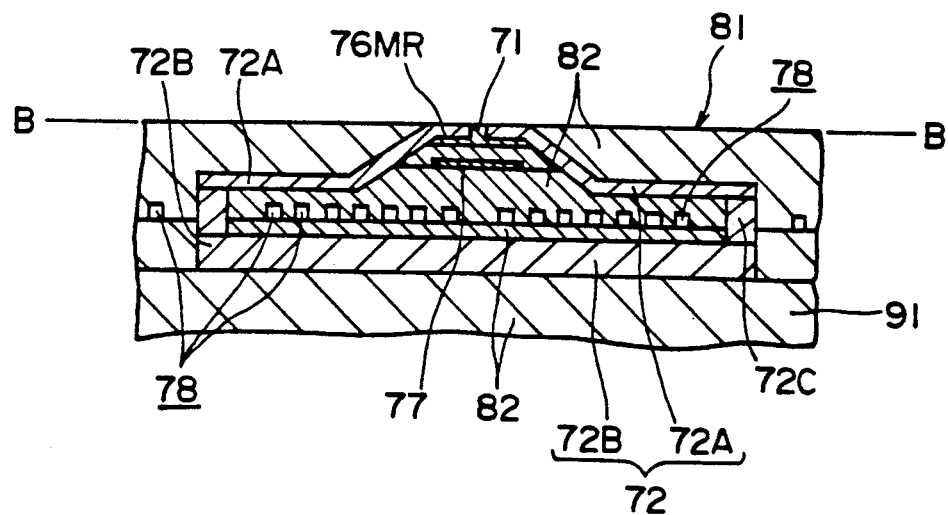
FIG. 9 is a cross section taken along the line B—B in FIG. 7.

Referring to FIG. 9 which is a cross section taken along the line B—B in FIG. 7 showing a yoke type planar MR head including an MR device, a thin film magnetic core 72 consists of a pair of upper yokes 72A and a lower yoke 72B which are formed of NiFe plating films or the like. A thin film coil 78 formed of Cu or the like is provided between the upper yokes 72A and the lower yoke 72B. Each upper yoke 72A is formed with a gradually upwardly inclined portion extending to an upper surface opposed to a magnetic recording medium, that is, extending to an ABS 81, and is also formed with a gap forming portion for forming a magnetic gap 71. The gap forming portion has an upper surface flush with the ABS 81. An MR device 36 is located below the magnetic gap 71, and a bias conductor 77 for generating a bias magnetic field is located below the MR device 36 in crossing relationship with each other. Reference numerals 82 designate insulator layers such as $SiO_2$ layers.

Such a thin film magnetic head is manufactured in the following manner. First, the lower yoke 72B is formed by flame plating or the like on an insulating base 91 formed of $Al_2O_3$·TiC, $CaTiO_3$, ferrite ceramic, crystallized glass, etc. Then, the first insulator layer 82 such as $SiO_2$ layer is formed on the lower yoke 72B, and the thin film coil 78 having a given pattern is formed on the first insulator layer 82. Then, the second insulator layer 82 such as $SiO_2$ layer is so formed as to entirely cover the coil 78. Then, the first and second insulator layers 82 are bored at opposite ends thereof by RIE (reactive ion etching) or the like, and the bores thus formed are then filled with a magnetic material such as NiFe to thereby form connecting portions 72C for connecting the upper yokes 72A with the lower yoke 72B. Then, the bias conductor 77 is formed on the second insulator layer 82, and the third insulator layer 82 is then formed to entirely cover the bias conductor 77. Then, the MR device 76 is formed on the third insulator layer 82, and the fourth insulator layer 82 is then formed to entirely cover the MR device 76. The formation of the bias conductor 77 and the MR device 76 can be effected by pattern etching using photolithography.

Figure 10:
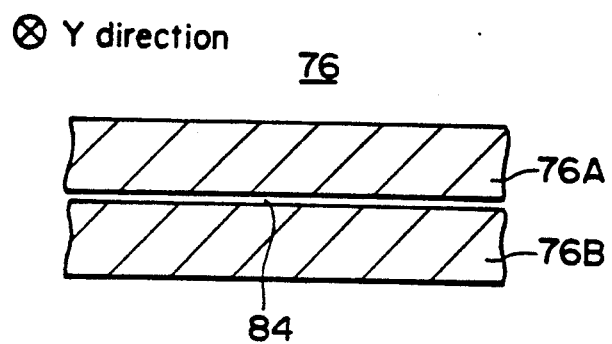
FIG. 10 is a sectional view of an MR device shown in FIG. 9.
Figure 11:
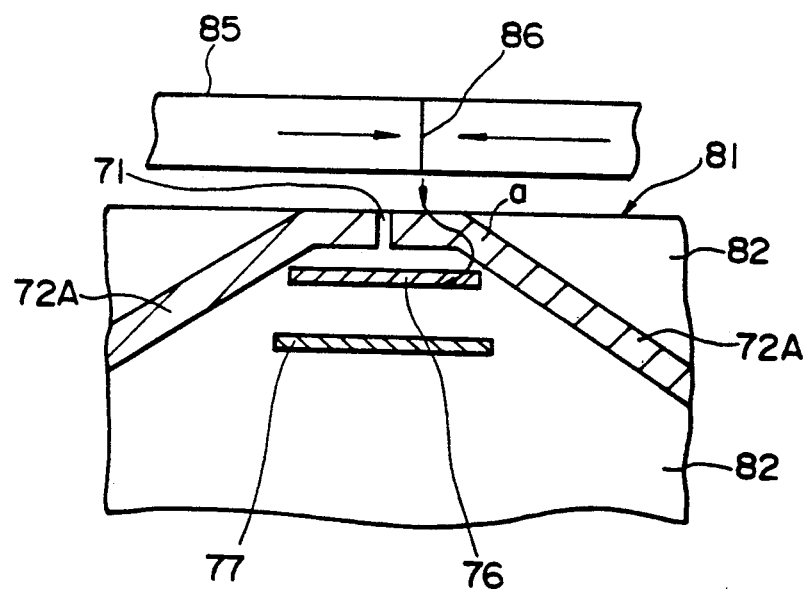
FIG. 11 is a sectional view explaining a reproducing operation of the thin film magnetic head shown in FIG. 9.
Figure 12:
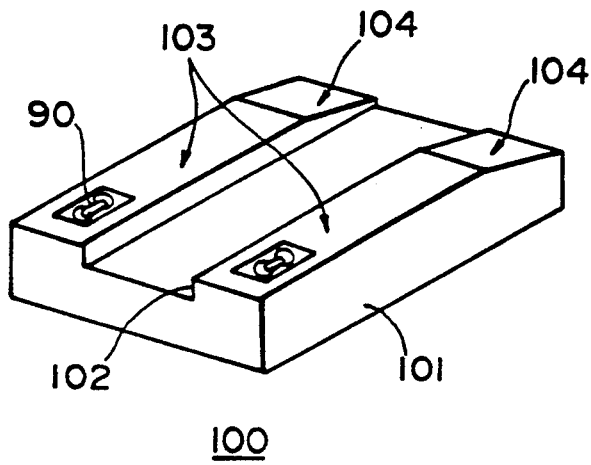
FIG. 12 is a perspective view of the magnetic head slider in the prior art.
Figure 13:
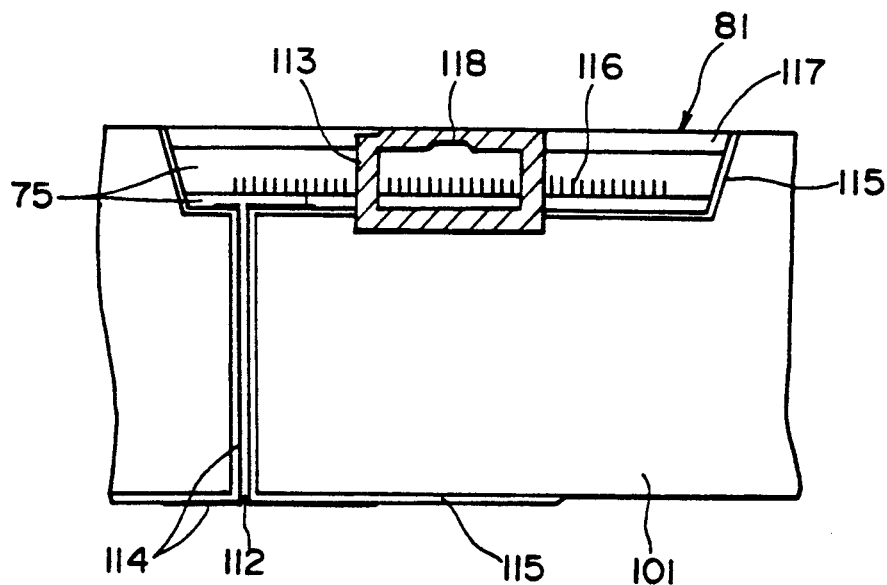
FIG. 13 is a sectional view of the thin film magnetic head in the prior art.
Figure 14:
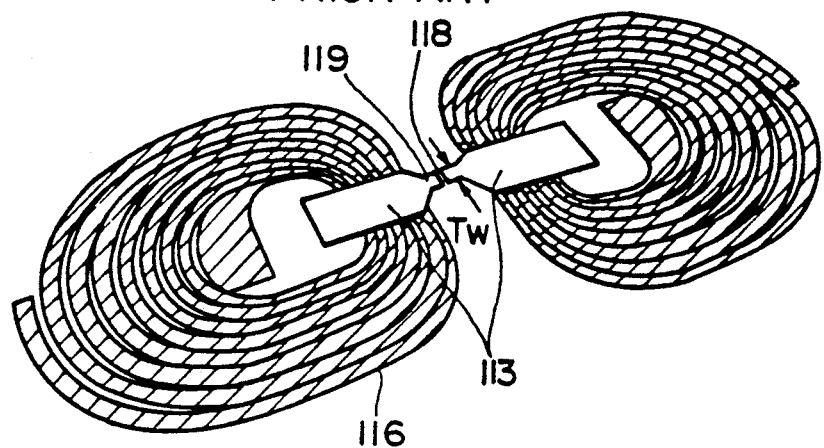
FIG. 14 is a perspective view of the magnetic gap in the prior art.
Figure 15:
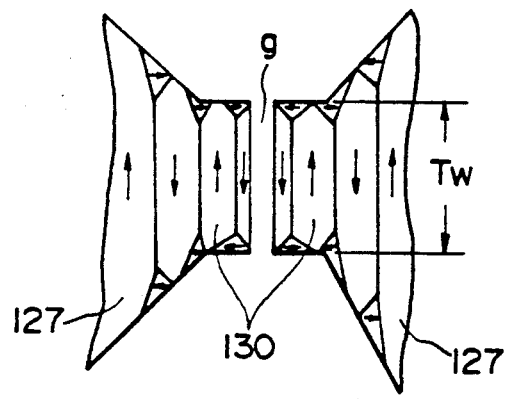
FIG. 15 is a schematic plan view illustrating the magnetic domain structure at the magnetic gap forming portion of the thin film magnetic head in the prior art.
Figure 16:
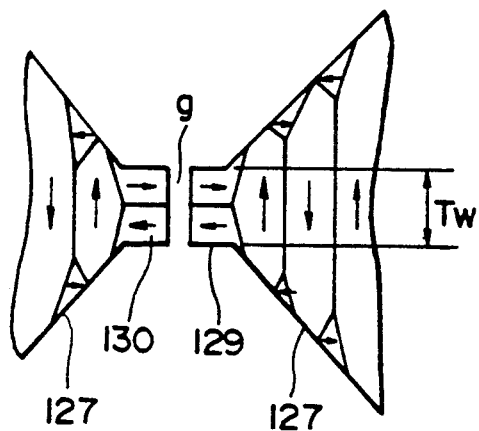
FIG. 16 is a view similar to FIG. 15, showing the magnetic domain structure in the case that the track width is more reduced.
Figure 17:
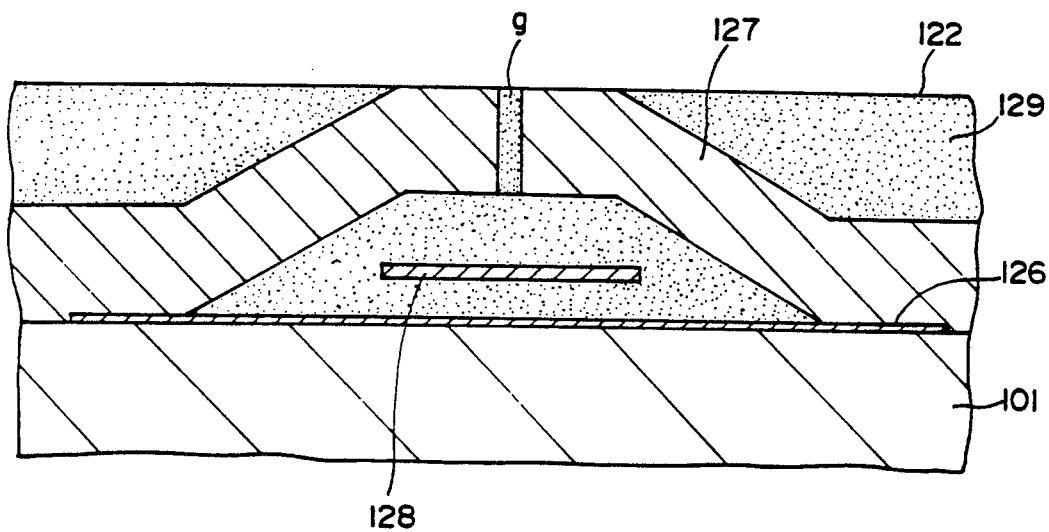
FIG. 17 is a sectional view of an essential part of the MR type thin film magnetic head in the prior art.

Referring to FIG. 10 which is a schematic enlarged sectional view of the MR device 76, the MR device 76 is composed of first and second MR thin films 76A and 76B of NiFe layers each having a thickness of about 300 angstroms and of a non-magnetic layer 84 interposed between the first and second MR thin films 76A and 76B. The non-magnetic layer 84 is formed of $SiO_2$, and has a thickness of about 30 angstroms so that the first and second MR thin films 76A and 76B each having an axis of easy magnetization in a direction of a track width (i.e., Y direction) may generate static magnetic connection but hardly generate exchange interaction.

Referring to FIG. 9, the second to fourth insulator layers 82 surrounding the bias conductor 77 and the MR device 76 are taperingly etched so as to upwardly taper toward the gap forming portion. Then, the fourth insulator layer 82 is anisotropically etched except a projection thereof forming the magnetic gap 71. Then, the upper yokes 72A are formed on the second to fourth insulator layers 82 as etched above so as to be connected to the connecting portions 72C by plating NiFe or the like and then patterning the plated NiFe to a desired pattern. Then, the fifth insulator layer 82 as a protection film of $SiO_2$ or the like is formed on the upper yokes 72A, and an upper surface of the fifth insulator layer 82 is polished to form the ABS 81, thus obtaining a thin film magnetic head.

In the thin film magnetic head as obtained above, a width of opposed end surfaces 73 of the upper yokes 72A of the thin film magnetic core 72 defining the magnetic gap 71 therebetween, that is, a track width Tw as shown in FIG. 7 is set to 5 μm. Further, the upper yokes 72A on the right and left sides with respect to the magnetic gap 71 as viewed in FIG. 7 are gradually widened as they come away from the magnetic gap 71. A divergent angle $\theta$ of one side edge 74A of the right upper yoke 72A from a direction of a gap length of the magnetic gap 71 (i.e., X direction) is set to about 45°. Similarly, a divergent angle $\theta$ of one side edge 75A of the left upper yoke 72A from the X direction is set to about 45°. The side edge 75A is formed on the opposite side of the side edge 74A with respect to the magnetic gap 71. Furthermore, the other side edge 74B of the right upper yoke 72A and the other side edge 75B of the left upper yoke 72A extend in substantially parallel to the X direction. The MR device 76 located below the magnetic gap 71 extends in the X direction, and the bias conductor 77 located below the MR device 76 extends in a Y direction perpendicular to the X direction. As mentioned above, the side edges 74A and 75A of the right and left upper yokes 72A formed in symmetrical relationship with each other with respect to the magnetic gap 71 are inclined at about 45°. from the X direction. Accordingly, the upper yokes 72A as a whole is inclined at about 45° clockwise from the X direction. Therefore, the lower yoke 72B is also inclined at about 45° clockwise from the X direction with the thin film coil 78 interposed between the same and the upper yokes 72A.

With this construction, a gap forming portion of the thin film magnetic core 72 forming the magnetic gap 71 can be made substantially wide even though the track width Tw is narrow such that it is set to about 5 μm. Accordingly, referring to FIG. 8 which shows a magnetic domain structure of the magnetic head, the axis of easy magnetization can be made coincident with the direction of the track width, i.e., the Y direction, thereby avoiding a reduction in magnetic permeability and obtaining a good reproductive output.

Referring back to FIG. 7, the side edge 74B of the right upper yoke 72A extends in substantially parallel to the X direction. In other words, in an off track area as shown by the line A—A in FIG. 7, the right upper yoke 72A is not present, and no magnetic gap is defined, thereby avoiding adjoining crosstalk and off track crosstalk.

It is considered that a shield effect of the upper yokes 72A to the MR device 76 will be lost because either, of the upper yokes 72A lacks in the off track area. However, since a magnetic flux by an off track signal is not actually applied in the direction of the axis of easy magnetization of the MR device 76, this signal is hardly reproduced. That is, referring to FIG. 11 which shows a reproducing operation of the magnetic head, a reproductive signal is obtained when a magnetization transit portion 86 of a magnetic recording medium 85 comes to a position offset from a position just over the magnetic gap 71, and a magnetic flux having entered a part of the upper yokes 72A in a direction of the arrow a flows in a direction along an axis of difficult magnetization of the MR device 76.

Although the divergent angle θ of the side edges 74A and 75A of the right and left upper yokes 72A from the X direction is set to about 45° in the above preferred embodiment, this angle θ may be set to the range of 30°≦θ≦80°. In this range, it is confirmed that significant crosstalk is hardly generated. Further, although the side edges 74B and 75B of the right and left upper yokes 72A are substantially parallel to the X direction in the above preferred embodiment, they may be slightly inclined from the X direction provided that significant crosstalk is hardly generated.

Further, the NiFe plated film of the thin film magnetic core 72 in the above preferred embodiment may be replaced with FeCoNi plated film, NiFe sputtered film, FeAlSi sputtered film, Fe alloy sputtered film, or amorphous magnetic film such as CoZrNb or CoNrTa. The recording coil 78 and the bias conductor 77 may be formed of Al sputtered or plated film instead of Cu sputtered or plated film.

Further, although the present invention is applied to the yoke type planar thin film magnetic head employing the MR device in the above preferred embodiment, it may be also applied to a thin film magnetic head employing a coil for carrying out recording and reproducing.

It will be apparent that various modifications and/or additional may be made in the apparatus of the invention without departing from the essential feature of novelty involved, which are intended to be defined and secured by the appended claims.

What is claimed is:

1. A planar thin film magnetic head having a thin film magnetic yoke formed with a magnetic gap, said thin film magnetic yoke extending substantially along a recording surface of a magnetic recording medium;
   said planar thin film magnetic head comprising a conductor layer located at an intermediate position of said magnetic gap, said conductor layer extending in the gap length direction so as to cross said magnetic gap, said conductor layer being supplied with current.

2. The planar thin film magnetic head as defined in claim 1, wherein said magnetic head comprises an electromagnetic induction type thin film magnetic head having a coil.

3. A planar thin film magnetic head comprising:
   a base;
   a back thin film magnetic yoke provided on said base;
   an MR element provided above said back thin film magnetic yoke;
   a thin film magnetic yoke magnetically connected to opposite ends of said MR element and having a magnetic gap;
   a bias conductor arranged near said gap and aligned transverse to the gap length of said magnetic gap for applying a bias magnetic field to said MR element; and
   a first conductor layer extending in the gap length direction of said magnetic gap so as to cross said magnetic gap.

4. The planar, thin film magnetic head as defined in claim 3, wherein said thin film magnetic yoke comprises two layers, and said first conductor layer is interposed between said two layers.

5. The planar thin film magnetic head as defined in claim 3 further comprising a protection film provided on said thin film magnetic yoke except a gap forming portion thereof forming said magnetic gap.

6. The planar thin film magnetic head as defined in claim 3, wherein said magnetic head comprises a thin film magnetic head having a coil.

7. A thin film magnetic head comprising a thin film magnetic core having a magnetic gap substantially parallel to a magnetic recording medium;
   said thin film magnetic core comprising a pair of magnetic members having opposed end surfaces between which said magnetic gap is defined, said opposed end surfaces having a width defining a track width;
   said magnetic members being gradually widened as they come away from said magnetic gap so that a divergent angle θ of first opposite side edges of said magnetic members from a direction of a gap length of said magnetic gap is set to the range of 30°≦θ≦80°; and
   said magnetic members having second opposite side edges extending in substantially parallel to the direction of the gap length of said magnetic gap.

8. A magnetic head according to claim 7, further comprising a coil.

9. A magnetic head in the form of a planar type thin film comprising:
   a substrate;
   a thin film magnetic core supported on said substrate and comprising a first upper yoke, a second upper yoke, and a lower yoke;
   a magnetic gap formed between said first upper yoke and said second upper yoke;
   an MR element provided between said upper yoke and said lower yoke;
   a bias conductor for applying a bias magnetic field to said MR element provided between said upper yoke and said lower yoke;
   said first upper yoke and said second upper yoke being gradually widened as they come away from said magnetic gap so that a divergent angle θ of first opposite side edges of said upper yokes from the direction of the gap length of said magnetic gap is set to the range of 30°≦θ≦80°; and
   said upper yokes having second opposite side edges extending in substantially parallel to the direction of the gap length of said magnetic gap.

10. A magnetic head according to claim 9 further comprising a coil.

11. A magnetic head according to claim 9, wherein said upper yolk has a protective film deposited thereon except where said magnetic gap exists.

* * * * *